United States Patent [19]
Gowen

[11] 3,778,216
[45] Dec. 11, 1973

[54] MOLDS FOR USE IN FREEZING FOOD PRODUCTS TOGETHER WITH MEANS TO EJECT THE FROZEN BLOCKS FROM THE MOLD FRAMES

[75] Inventor: Remi Harold Gowen, Standish, Maine

[73] Assignee: Gowen, Inc., Portland, Maine

[22] Filed: May 13, 1971

[21] Appl. No.: 143,087

[52] U.S. Cl. .............................. 425/444, 249/66
[51] Int. Cl. .................................... B28b 13/04
[58] Field of Search ..................... 425/255, 444; 249/66, 121

[56] References Cited
UNITED STATES PATENTS

| | | | |
|---|---|---|---|
| 1,754,484 | 4/1930 | Pelton | 425/444 X |
| 689,015 | 12/1901 | McNaught | 249/66 X |
| 3,604,678 | 9/1971 | Vojens | 249/66 |
| 3,649,146 | 3/1972 | Moore | 425/444 X |
| 1,029,559 | 6/1912 | Pauly | 424/444 |
| 2,985,935 | 5/1961 | Wellnitz | 425/444 X |
| 3,353,236 | 11/1967 | Stedman | 425/444 X |
| 2,460,697 | 2/1942 | Kreger | 249/66 |
| 3,414,229 | 12/1968 | Norberg | 249/121 |

*Primary Examiner*—J. Spencer Overholser
*Assistant Examiner*—Ben D. Tobor
*Attorney*—Abbott Spear

[57] ABSTRACT

Molds are disclosed for use in the freezing of food products, each consisting of a pan, a mold frame, and a cover. The outer face of each side of the frame has a channel extending from end-to-end thereof and providing a shoulder exposed when the cover is removed above the pan. An ejector straddles the infeed end of a pan conveyor and has side supports providing a slideway underlying the frame shoulders to slidably support the food filled frame and the pan frozen to the bottom thereof above the conveyor with the frame held horizontally and against any material side-to-side play. The ejector has air-operated means operable to engage each food block and push it downwardly from its frame so that it and the pan drop to the conveyor with the resulting jolt freeing the block from the pan.

1 Claim, 4 Drawing Figures

PATENTED DEC 11 1973 3,778,216
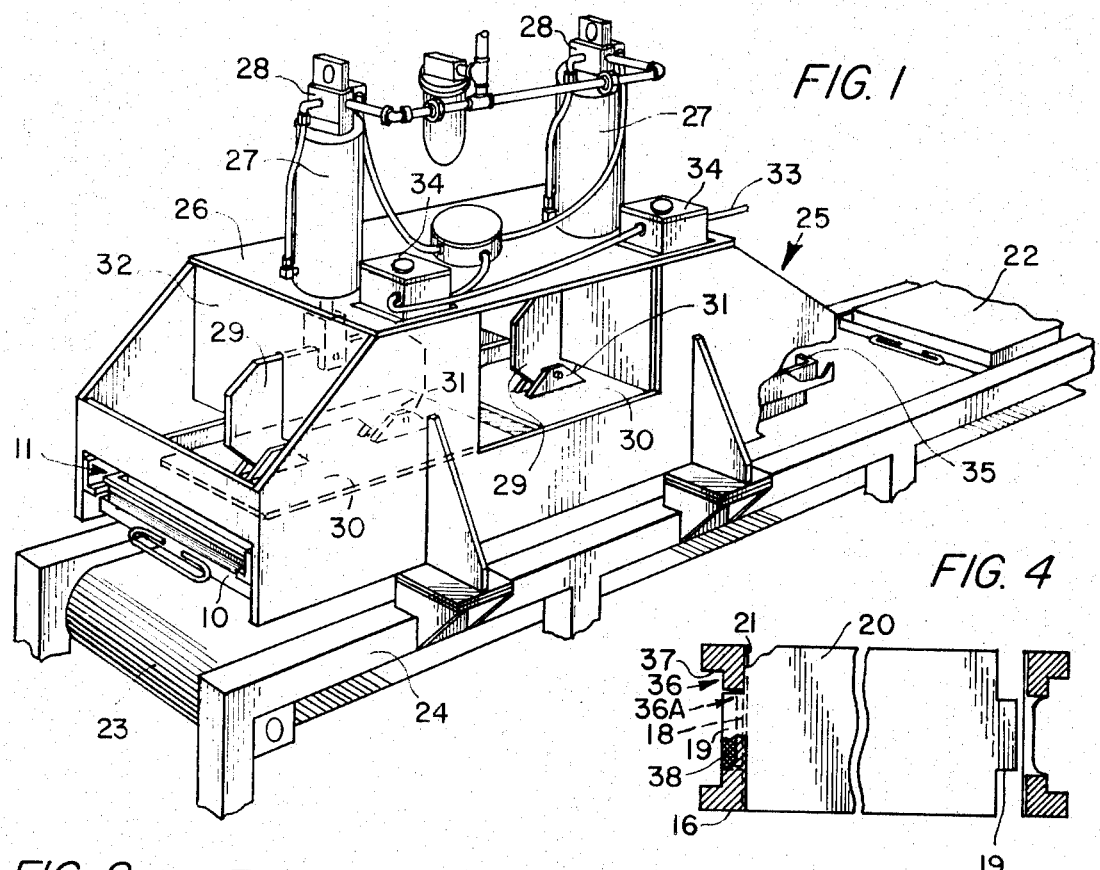
FIG. 1
FIG. 4
FIG. 2
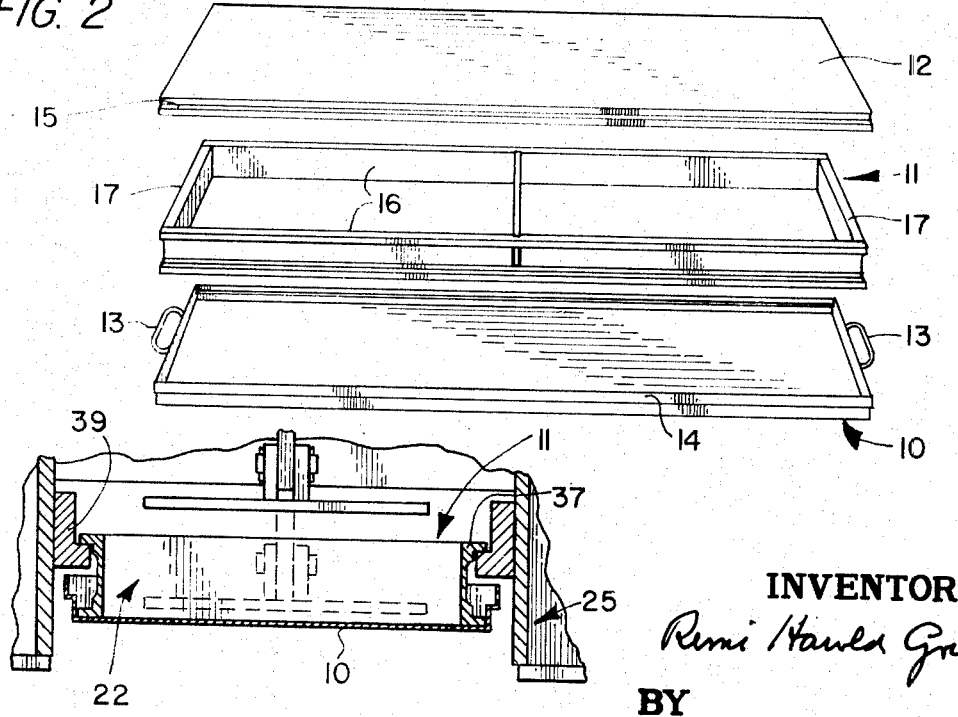
FIG. 3
INVENTOR
Remi Harold Green
BY
Albert Spear
ATTORNEY

MOLDS FOR USE IN FREEZING FOOD PRODUCTS TOGETHER WITH MEANS TO EJECT THE FROZEN BLOCKS FROM THE MOLD FRAMES

BACKGROUND OF THE INVENTION

In the commercial freezing of food products, of which fish are but one example, the food is frozen in molds that have pans supporting mold frames, usually compartmented, which in turn, support covers. After the food-filled molds are frozen, the frozen food blocks are removed from their mold frames and sawed into smaller portions which are then packaged.

This procedure has one problem and that is that while the covers are readily removed, the molds are usually securely frozen to the frames and to the frozen blocks of the product. As a consequence, it was necessary for an employee to hammer free the food blocks from their frames by means of a rubber mallet. This procedure was objectionable because it frequently resulted in the blocks being broken with consequent loss in value and waste of the food product.

THE INVENTION

The general objective of the present invention is to eliminate the manual operation of hammering free the frozen food blocks from their frames, an objective attained by providing a conveyor with an ejector at its infeed end having supports at each side spaced above the conveyor. The outer face of the sides of each mold frame and the ejector supports are provided with end-to-end, mutually engageable surfaces arranged and dimensioned to slidably support the frame, when the cover has been removed, and the pan frozen thereto above the conveyor but otherwise unsupported with the frame held horizontally and against any material side-to-side movement. The ejector is provided with power operated means operable to force the blocks from the suspended frames and drop them and their molds on the conveyor so that the blocks are delivered for further processing without being handled, still on their molds but jolted free therefrom.

In the accompanying drawings, there is shown an embodiment of the invention illustrative of these and other of its objectives, novel features, and advantages.

In the drawings:

FIG. 1 is a perspective and somewhat schematic view of a conveyor, a block ejector, and mold in accordance with the invention;

FIG. 2 is an exploded view of the mold showing the pan and cover in perspective and the mold frame in plan;

FIG. 3 is a cross section through the assembled tray and the frame supports of the ejector; and FIG. 4 is a vertical section through a frame side showing the junction of the partition therewith.

A mold in accordance with the invention is shown as including a pan 10, a block-molding frame generally indicated at 11, and a cover 12. The construction of the pan and cover is not important but the pan 10 is shown as having handles 13 at its ends and the pan 10 and cover 12 with their walls stiffened by bends establishing outwardly disposed shoulders 14 and 15, respectively.

While the invention is adapted for use with single block molds, it is herein detailed with a frame 11 that is compartmented. The mold frame 11 has its sides 16 and ends 17 formed, for convenience, from appropriate lengths of extruded stock of the same cross sectional size and shape and welded together at the corners. Each frame side 16 has a vertical slot 18 midway between its ends through which one of the end tabs 19 of a transverse partition 20 protrudes and is secured as by welding it to that side wall. The inner surface of each side 16 has a shallow, vertical channel 21 receiving a partition end.

In use, a mold frame 11 is placed, either side up, in a pan 10 and a wax paper carton, not shown, is placed in each of its compartments and filled with the food product and its cover 12 is then put in place. The filled mold is then placed in a freezer and when the frozen product is to be packaged, the molds are taken from the freezer and their covers 12 are removed. While the covers are readily removable, the pans 10 invariably are frozen to the bottom of the mold frame 11 and, of course, the frozen block in each frame compartment must be dislodged as a unit indicated generally at 22 so that the block can be sawed into smaller portions of the desired size for packaging.

In accordance with the invention, a conveyor 23 is provided leading to a station where the blocks are removed from the pans 10 and the pans collected for reuse. The supporting structure 24 of the conveyor 23 supports, at its infeed end, a conveyor-straddling, block ejector, generally indicated at 25. The ejector 25 has a housing 26 supporting a pair of fluid pressure operated piston-cylinder units 27, conveniently air operated, each having a solenoid operated control valve 28 and a bar 29 pivotally connected to its stem to which bar a pressure plate 30 is connected by longitudinally spaced pivots 31. The bars 29 extend through vertical slots in transverse walls 32 and are held thereby against turning. The plates 30 are spaced and dimensioned so that each will seat against a substantial portion of the block 22 within an appropriate one of the compartments. The circuit 33 to the solenoids of the two units 27 includes a pair of normally open, push button switches 34 arranged in series so that both hands of the operator must be used in operating the ejector. It should be here noted that it is essential that the engagement of the pressure plates with the frozen food blocks be such as to prevent the fracturing of the frozen food blocks. For that reason, the rate of travel of the pressure plates 30 must be relatively slow in order to push the frozen food blocks free from their frame 11. Desirably the rate of piston travel of the units 27 is adjustable so that the operator may select the best operating rate.

The housing 26 and the mold frame 11 have mutually engageable surfaces by which a food-filled frame 11 and the pan 10 frozen to its undersurface is slidably supported with the frame 11 seated against a stop 35 and held horizontal and against any material side-to-side movement and with the pan 10 otherwise free. The position of the held frame 11 is above the conveyor 23 a distance such that, on the operation of the units 27, the pressure plates will push free the subjacent blocks 22 and the pan 10 to which they are frozen from the suspended frame 11 so that the blocks and their pan drop, usually as units, onto the conveyor 23 with the blocks jolted free by such a drop but still on the appropriate pan 10 while carried to the outfeed end of the conveyor where the blocks and pans are separately removed.

It is preferred, in order to carry out the above, that the outer faces of each frame side 16 be formed or otherwise provided with a channel 36 extending from endto-end thereof and providing shoulders 37, each spaced the same distance from an appropriate one of the edges of a side so that a mold frame 11 may be used, either side up. Each channel 36 is centrally dished as at 36A through which the vertical slot 18 extends, see FIG. 4, and which accommodates a tab end 18 and the weld 38 by which it is secured. It is preferred that the supporting surfaces of the housing 26 be transversely aligned flanges 39 having planar, horizontal surfaces and that the channel shoulders 37 also be planar, horizontal surfaces. The channel depths are such, adjacent the shoulders 37, as to provide the desired sliding fit with the flanges 39.

It will be further noted that a frame 11 cannot be slidably supported by the ejector 25 until its cover 12 is removed. The shoulders 37 are then exposed above the sides of the pan 10 frozen to that mold frame 11.

It will thus be apparent that the invention expedites packaging by enabling the frozen blocks to be quickly and easily removed without damage from the mold frames.

I claim:

1. In combination, a conveyor, a mold comprising a frame and a frame supporting pan, each pan-supported frame to be filled with a food product and frozen, the pan and the frozen product then adhering to the frame, an ejector including a slideway, said slideway and the sides of said frame including portions interengageable to slidably hold the frame in a horizontal position, said frame portions being exposed above the pan, and the sides of said pan extending outwardly beyond said frame portions, said ejector portions being located at the sides of the conveyor and at a distance above said conveyor such that the frame with the pan if still adhering thereto are held thereby with the pan spaced above the conveyor and otherwise unsupported, said ejector including at least one vertically reciprocable pressure member and operable to effect such engagement of the member with the frozen food product that the product is pushed downwardly from the frame as an unfractured block carrying the pan with it so that the block drops with the pan onto the conveyor, the block being dislodged from the pan by the jolt attendant its drop but remaining supported thereby, and said mold includes a cover and the width of the slideway above the slideway portions is less than the width of the mold cover thereby to prevent the entrance of the cover into the path of the pressure member.

* * * * *